May 19, 1964                J. L. EDMAN ETAL                3,133,615
             HYDRAULIC SHOCK ABSORBER WITH IMPROVED PISTON VALVE MEANS
Filed July 2, 1962                                          3 Sheets-Sheet 2
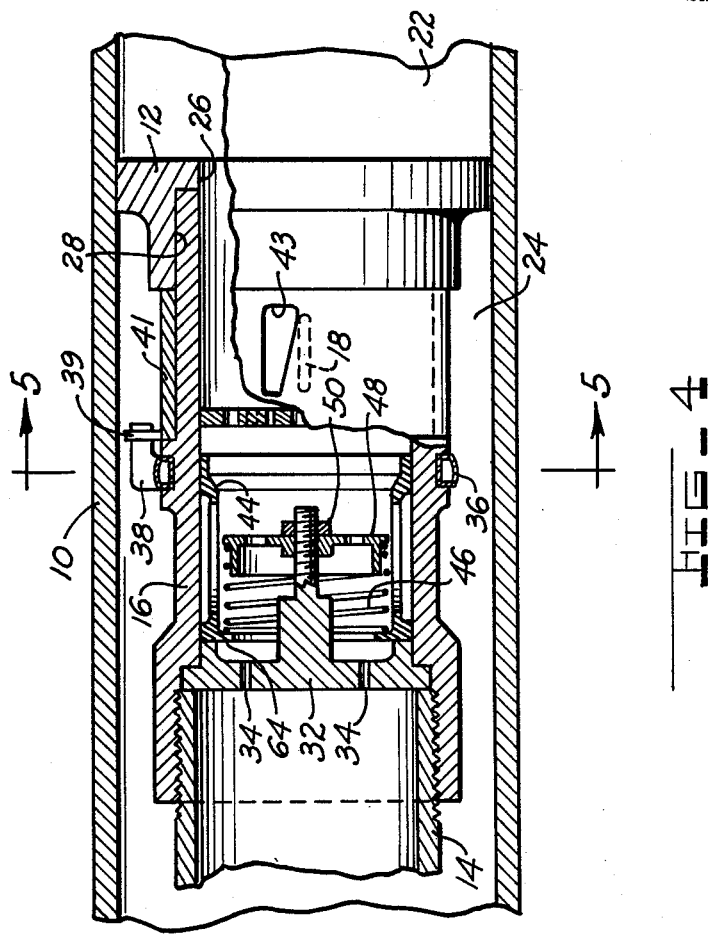
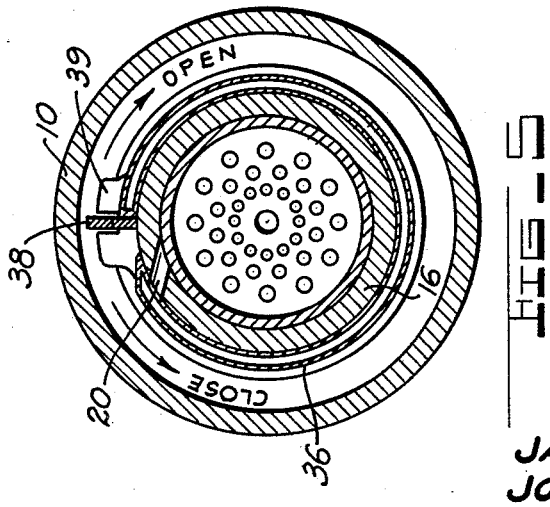
INVENTORS
**JAMES L. EDMAN
JOSEPH A. PORATH**
BY Cecil F Arena
ATTORNEY.

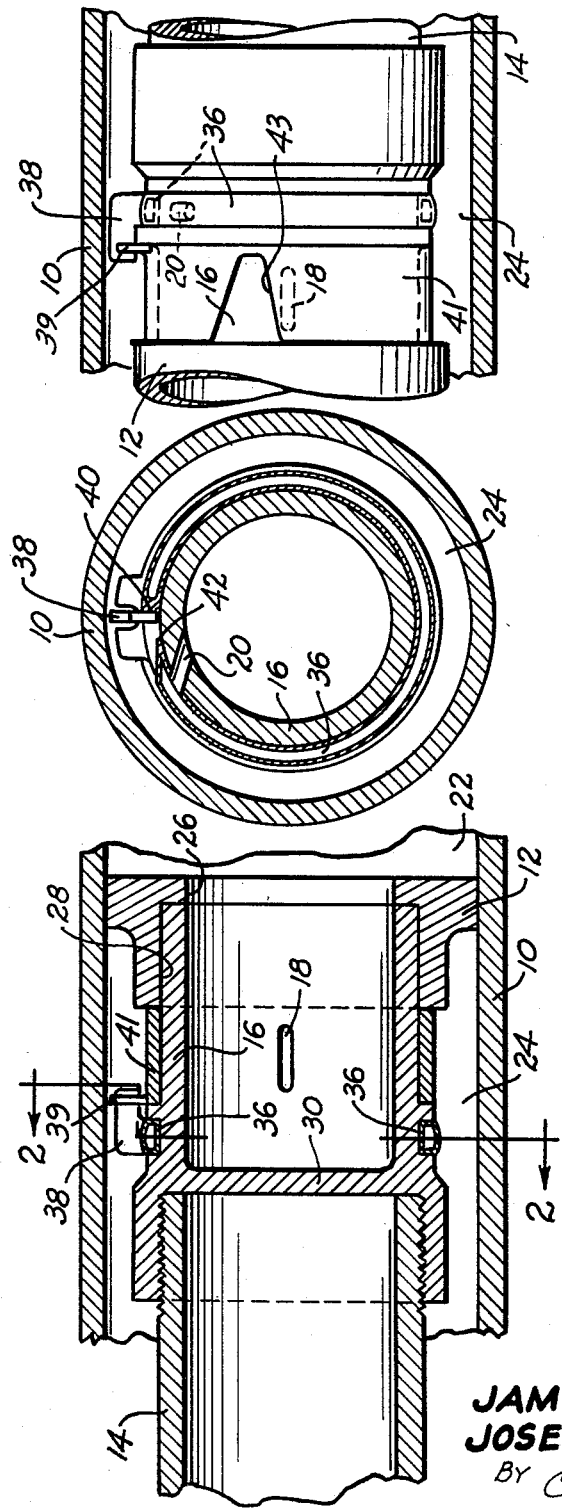
May 19, 1964     J. L. EDMAN ETAL     3,133,615
HYDRAULIC SHOCK ABSORBER WITH IMPROVED PISTON VALVE MEANS
Filed July 2, 1962     3 Sheets-Sheet 1
INVENTORS
JAMES L. EDMAN.
JOSEPH A. PORATH.
BY *Cecil F. Arens*
ATTORNEY.

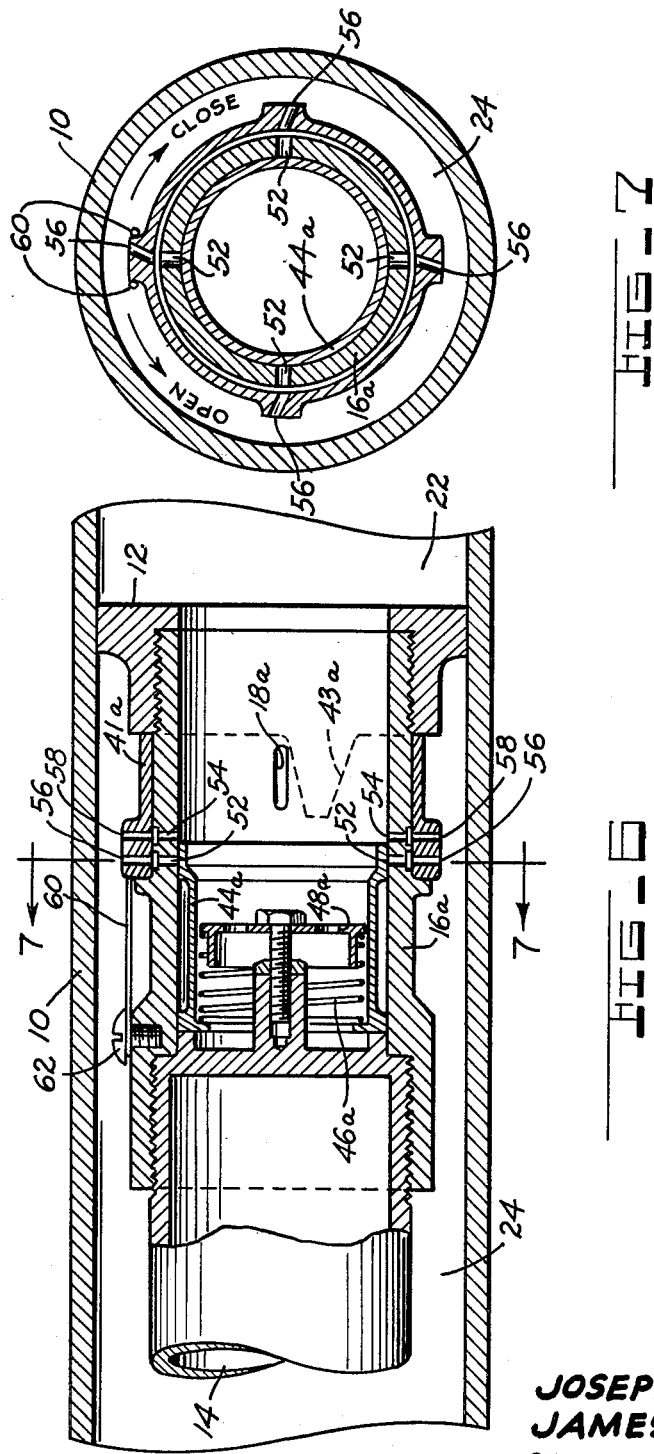

United States Patent Office 3,133,615
Patented May 19, 1964

3,133,615
HYDRAULIC SHOCK ABSORBER WITH IMPROVED PISTON VALVE MEANS
James L. Edman, La Crescenta, Calif., and Joseph A. Porath, South Bend, Ind., assignors to The Bendix Corporation, South Bend, Ind., a corporation of Delaware
Filed July 2, 1962, Ser. No. 206,651
5 Claims. (Cl. 188—100)

The present invention relates to shock absorbers which are responsive to external reactions which vary in both amplitude and velocity.

During the process of stopping a moving body, energy is transferred to a stopping device by applying a force-resisting motion over the stopping distance. If stopping distance is not important, then friction forces alone will eventually stop the body (if driving force is absent or of lower magnitude than friction forces). Usually, however, distance is limited, and the stopping force has to be carefully controlled for most favorable deceleration characteristics. The motion-opposing force may be a constant or a variable.

A shock absorber having a constant metering orifice provides a force acting to stop the object proportional to the square of the velocity of the traveling mass. This type of shock absorber is commonly used where one wishes to slow rather than stop an object.

The most efficient and economical device for stopping moving objects with uniform deceleration is a hydraulic shock absorber with a variable orifice. The orifice area normally varies exponentially with the stroke, providing maximum opening at the beginning of the stroke and closing to zero at the end of the stroke.

Changes in this orifice metering configuration permit one shock absorber to be applied over a wide range of impact velocity, inertia means and propelling force.

It is therefore an object of this invention to provide an automatic orifice varying means.

It is also an object of this invention to provide an orifice control which is subject to amplitude and velocity of fluid displacement which will permit utilization of a shock absorber in circumstances having widely varying reactions.

Another object is to provide a device which is responsive to both the amplitude and velocity of a shock absorber piston means with respect to a shock absorber chamber to efficiently absorb applied shock while minimizing tendency to introduce some shock attendant upon variations of amplitude and velocity.

Still another object of the present invention is to provide in such a device means for controlling the reaction of the shock absorber to obtain varying responses to the amplitude and velocity of the shock absorber piston rod, thus promoting smoother shock absorber action in aircraft, automotive, machine and railroad applications.

Further objects and advantages of the present invention will appear in the following specification referring to the drawings in which:

FIGURE 1 is a sectioned side view of a shock absorber employing my invention;

FIGURE 2 is an end section of the shock absorber of FIGURE 1 taken along line 2—2 of FIGURE 1;

FIGURE 3 is a side section of the shock absorber cylinder opposite that of FIGURE 1 and showing the internal structure in full;

FIGURE 4 is a partial side section of another form of our invention showing an adjustable acceleration means in combination with a fluid receiving means to adjust a metering orifice;

FIGURE 5 is an end section taken along line 4—4 of FIGURE 4,

FIGURE 6 is a side section of a shock absorber cylinder and piston arrangement showing a modified orifice control means in accordance with my invention; and FIGURE 7 is an end section of the modified orifice control means taken along line 7—7 of FIGURE 6.

With reference to the drawings, in which like numerals identify similar parts throughout, it will be seen that one embodiment of the present invention may comprise a shock absorber cylinder 10 having a piston 12 slidably mounted therein, which piston is operatively connected to a tubular member 14, as by an adapter 16.

The adapter 16 is shown in FIGURE 1 to be slotted as at 18 and in FIGURE 2 as at 20, which slots permit porting of fluid from one chamber to another. In more detail, the piston 12 separates the cylinder into at least two variable volume chambers generally indicated, as at 22 and 24. The piston 12 is bored, as at 26 and 28, so that the fluid in chamber 22 may pass therethrough and so that the adapter 16 may be mated therewith as by a threaded connection shown in FIGURE 6. The adapter 16 is also shown to be threaded to the piston rod 14, and in the form shown by FIGURE 1, the adapter is closed adjacent the connection with the piston rod 14 by an integral partition 30, which partition forms with piston 12 a movable wall for chamber 22.

In the device shown in FIGURE 4, an end plate 32 having spaced orifices 34 is held to the piston rod 14 by the adapter to function as the partition of FIGURE 1. As for the device of FIGURE 6, the piston tube 14 is closed on the end about which the adapter 16a is threaded to join the piston and the rod.

Getting back to FIGURE 1, the adapter 16 mounts a Bourdon tube 36 which is in flow relationship with chamber 22 through slot 20 in the adapter. A finger 38 is attached to the tube 36, as at 40, and the tube 36 is anchored to the adapter, as at 42, by any known means such as bonding, etc. The finger 38 engages a projection 39 of a sleeve 41 that is cut out along a side portion as at 43.

As for the adapter construction of FIGURE 4, it is similarly slotted as at 18 and 20 and mounts the Bourdon tube 36 carrying finger 38, which is similarly operatively connected to the ring 41. However, a spring held mass in the form of a ring 44 is mounted by spring 46 and cap 48 to the end plate 32, as by a threaded connector 50, which connection allows adjustment of spring forces on ring 44. The ring 44 in the normal position blocks the flow through slot 20, whereupon fluid displaced from chamber 22 is forced to pass through spaced orifices 34 into a cavity in the piston rod 14.

In FIGURE 6, there is shown a modified adapter 16a having slot 18a towards the front of the adapter and just behind the threaded connection of said adapter and the piston. In addition, two rows of four equispaced passages 52 and 54 are drilled through the wall of the adapter. The passage 52 is normally closed by the ring 44a, which ring is biased by spring 46a. The spring 46a is adjustably restrained by cap 48a. The passages 52 and 54 are in registry with passages 56 and 58, respectively of the ring 41a, which ring is slotted as at 43a. The ring 41a is normally located in the center position shown by a centering spring 60 held, as by tap screw 62, to the adapter shank.

With regard to our device shown by FIGURE 1, the displacement of fluid from chamber 22 to chamber 24 is controlled by the tapered edge of slot 43 progressively opening or closing the slot 18. The slot 43 is moved across the opening 18 by the effect of pressure in Bourdon tube 36, which pressure results from amplitude and velocity of piston stroking.

While the device shown by FIGURE 4 is similar in operation, the slot 18 is only opened under excess acceleration. Otherwise, the fluid in chamber 22 is passed to chamber 24 and vice versa by constant area orifices 34. More particularly, when the device is greatly accelerated and suddenly stopped, as by "bottoming," as for example upon carrier deck landings when our device is incorporated into landing gear strut applications, the ring 44 could move towards the piston, or to the right as viewed in FIGURE 4, to open slot 20. The sudden pressure increase acting on the rear face 64 of ring 44 also aids in moving the ring.

As for our device shown by FIGURES 6 and 7, the ring 44a functions similarly as in the device of FIGURES 4 and 5, but the passages 52 and 54 do not lead to the Bourdon tube, but rather to the passages 56 and 58. The passages 56 and 58 are angled with the passages 56 being angled to the right and passages 58 to the left as partially seen in FIGURE 7. Fluid emerging from these passages set up a force vector which tends to rotate ring 41a to open or close slot 18a by drawing or withdrawing the angled face of slot 43a thereacross.

As other structure than described may be constructed without departing from the intent of our invention, we do not propose to be limited by the foregoing description. Instead, it is our intent that those skilled in the art will find the true scope of our invention in the appended claims.

We claim:

1. In a shock absorber having a cylinder separated into variable volume chambers by a piston, an automatic means to control the amount of fluid displaced from one of the chambers to another of the chambers, said automatic means comprising:
   means defining a tubular extension fixedly secured to the piston,
   a valve port formed in said extension through which fluid is forced from one chamber to the other by the sliding action of the piston which results in reducing the volume of one chamber and increasing the volume of the other chamber,
   rotatable sleeve means slidably carried by said tubular extension means and concentric therewith arranged for movement relative to said valve port to vary the effective flow area of said valve port and thus the flow of fluid therethrough, and
   force producing means responsive to a pressure condition of the fluid which varies with the amplitude and velocity of piston movement in the cylinder,
   said force producing means being operatively connected to said rotatable sleeve means for actuating the same to thereby vary the effective flow area of said valve port.

2. In a shock absorber as claimed in claim 1 wherein said force producing means comprises:
   a Bourdon tube fixedly secured at one end to said tubular extension and at the opposite end to said rotatable means, and
   a passage communicating the interior of said Bourdon tube with the pressurized fluid upstream from said valve port which fluid pressure varies with the amplitude and velocity of piston movement.

3. In a shock absorber as claimed in claim 1 wherein said force producing means comprises:
   first and second passages formed in the walls of said tubular extension and said rotatable sleeve means, respectively, through which fluid pressurized by the piston in response to the amplitude and velocity of movement thereof is forced from the one chamber to the other chamber,
   said first and second passages being angularly arranged such that the pressurized fluid ejected from said first passage enters said second passage and impinges against the wall thereof thereby generating a force tending to rotate said rotatable sleeve means.

4. In a shock absorber having a cylinder separated into variable volume chambers by a piston, an automatic means to control the amount of fluid displaced from one of the chambers to another of the chambers, said automatic means comprising:
   means defining a tubular extension fixedly secured to the piston,
   a valve port formed in said extension through which fluid is forced from one chamber to the other by the sliding action of the piston which results in reducing the volume of one chamber and increasing the volume of the other chamber,
   rotatable sleeve means slidably carried by said tubular extension means and concentric therewith arranged for movement relative to said valve port to vary the effective flow area of said valve port and thus the flow of fluid therethrough,
   force producing means responsive to a pressure condition of the fluid which varies with the amplitude and velocity of piston movement in the cylinder,
   said force producing means being operatively connected to said rotatable sleeve means for actuating the same to thereby vary the effective flow area of said valve port, and
   acceleration responsive means operatively connected to said tubular extension for controlling the communication of the fluid to said force producing means in response to movement of the piston and tubular extension secured thereto.

5. In a shock absorber having a cylinder separated into variable volume chambers by a piston, an automatic means to control the amount of fluid displaced from one of the chambers to another of the chambers, said automatic means comprising:
   means defining a tubular extension fixedly secured to the piston,
   a valve port formed in said extension through which fluid is forced from one chamber to the other by the sliding action of the piston which results in reducing the volume of one chamber and increasing the volume of the other chamber,
   always open passage means in parallel flow relationship with said valve port,
   rotatable sleeve means slidably carried by said tubular extension means and concentric therewith arranged for movement relative to said valve port to vary the effective flow area of said valve port and thus the flow of fluid therethrough,
   a Bourdon tube fixedly secured at one end to said tubular extension and at the opposite end to said rotatable sleeve means for actuating the latter,
   a passage communicating the interior of said Bourdon tube with the pressurized fluid upstream from said valve port, and
   acceleration responsive means operatively connected to said tubular extension for blocking said last named passage in response to a predetermined rate of movement of the piston and tubular extension secured thereto.

References Cited in the file of this patent

UNITED STATES PATENTS

| | | |
|---|---|---|
| 2,161,811 | Grebe | June 13, 1939 |
| 2,347,803 | Allen et al. | May 2, 1944 |
| 2,774,448 | Hultin | Dec. 18, 1956 |
| 2,919,719 | Boulet | Jan. 5, 1960 |
| 2,929,471 | Schnitzer | Mar. 22, 1960 |
| 2,934,175 | Schnitzer | Apr. 26, 1960 |
| 2,937,724 | Schnitzer | May 24, 1960 |
| 3,014,557 | Rowe et al. | Dec. 26, 1961 |

FOREIGN PATENTS

| | | |
|---|---|---|
| 1,054,788 | Germany | Apr. 9, 1959 |